United States Patent [19]

Christoph

[11] 4,197,522
[45] Apr. 8, 1980

[54] ELECTROLYTIC SIGNAL DETECTOR WITH AN ORIFICE CATHODE

[75] Inventor: Walter P. Christoph, Riverdale, Md.

[73] Assignee: The United States of America as represented by the Secretary of the Navy, Washington, D.C.

[21] Appl. No.: 451,317

[22] Filed: Aug. 20, 1954

[51] Int. Cl.² ................. G01V 1/00; H04B 13/00; H04R 15/00
[52] U.S. Cl. ............................................ 367/149
[58] Field of Search ............... 340/213, 8, 11, 13, 340/13 E; 310/2,

[56] References Cited

U.S. PATENT DOCUMENTS

| Re. 22,971 | 2/1948 | Burgess | 310/2 |
|---|---|---|---|
| 2,492,493 | 12/1949 | Misson | 310/2 |
| 2,615,940 | 10/1952 | Williams | 310/2 |
| 2,661,430 | 12/1953 | Hardway | 310/2 |

Primary Examiner—Theodore M. Blum
Attorney, Agent, or Firm—R. S. Sciascia; A. L. Branning

EXEMPLARY CLAIM

1. A pressure responsive electrolytic detector of the character disclosed comprising a hermetically sealed casing having an electrolyte composed of a solution of iodine and potassium iodide in a solvent disposed therein, a baffle member within said casing arranged to form two fluid filled chambers on opposite sides thereof, said casing and baffle member being composed of insulating material, a pair of electrically connected inert electro-conductive anodes, each of said anodes being disposed within one of said chambers, an electro-conductive cathode having an aperture therein and arranged transversely within said baffle member, a pair of conic surfaces on said baffle member on opposite sides of said cathode and forming an aperture in contiguous abutting relation with the aperture in said cathode, said conic surfaces increasing the rate of flow of the electrolyte from one to the other of said chambers, and means on said casing responsive to acoustic signals for providing a signal detection characterized by a unidirectional electrical current flow in correlation to flow of electrolyte alternatingly between said chambers as an acoustic signal is received thereby.

10 Claims, 8 Drawing Figures

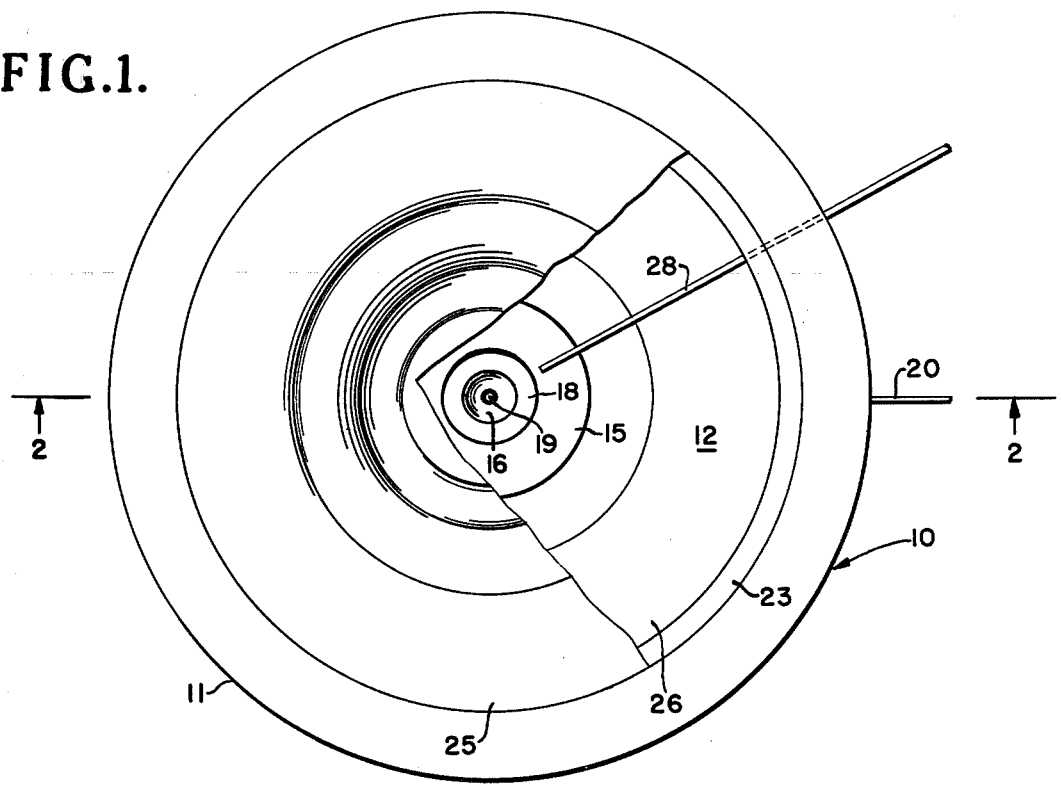
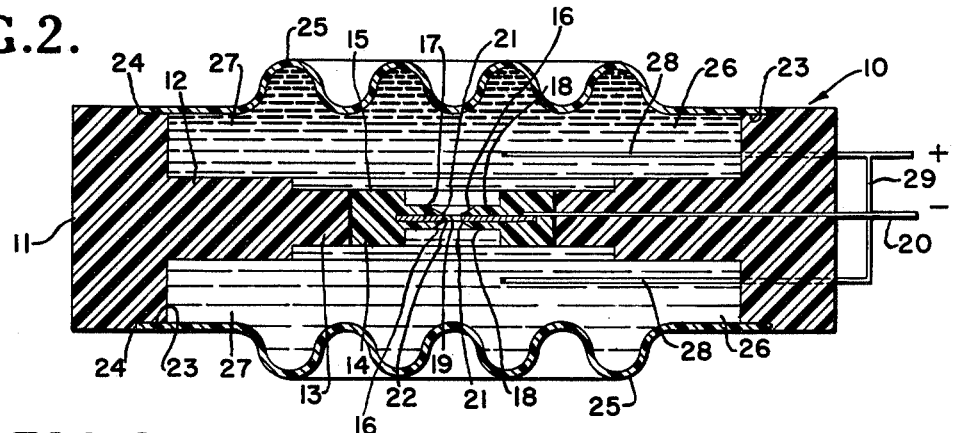
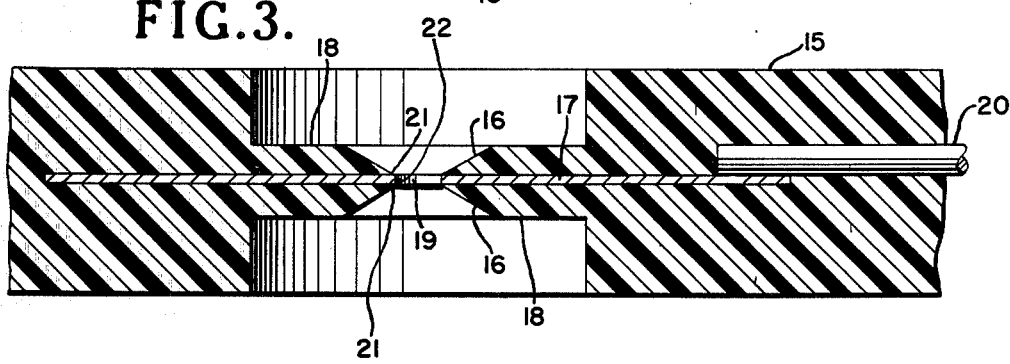

ELECTROLYTIC SIGNAL DETECTOR WITH AN ORIFICE CATHODE

The invention described herein may be manufactured and used by or for the Government of the United States of America for governmental purposes without the payment of any royalties thereon or therefor.

The present invention relates to a detector and more particularly to a new and improved low frequency pressure sensitive electrolytic detector suitable for use in a submarine mine or the like. Moreover, the invention relates to a device for detecting pressure signals or vibrations received through an elastic medium and is particularly adapted for use with a submarine mine or the like in which means responsive to a pressure signal received from an approaching vessel are employed for controlling the detonation of the mine. The detector, if desired, may also be used in land mines, sonobuoys and as a monitoring element for small flow measurements and numerous other devices wherein a relatively low output voltage is required to cause operation of such devices.

The disadvantages of devices of this character heretofore devised are bulkiness, considerable power consumption, insensitivity to very low pressure signals, erratic operational characteristics and lack of leak proof features essential in such devices.

The present invention contemplates the provision of a new and improved electrolytic detector which overcomes all the disadvantages encountered in prior art devices by providing a device which is small, requires only low power consumption, is sensitive in response to minute low pressure signals, and which has all the desired operational and leak proof characteristics.

The detector, in accordance with a preferred embodiment of the invention, comprises a pair of normally biased electrodes immersed in a volume of electrolyte, the electrolyte being confined and sealed within a casing composed of insulating material and enclosed by a pair of flexible diaphragms disposed on opposite sides thereof. The diaphragms are preferably composed of non-conducting material such as a flexible plastic. The casing includes a baffle plate of insulating material disposed between the flexible diaphragms in such manner as to provide two chambers enclosing a volume of electrolyte. A pair of properly electrically biased electrodes are immersed in the electrolyte, one of such electrodes being in each of the chambers and electrically connected externally to the other electrode. The baffle plate is provided with an apertured disc centrally disposed therein and in alignment with a circular orifice formed in a thin flat cathode preferably molded within the baffle member in such manner that only that portion of the cathode forming the orifice is in contact with the electrolyte. The cathode and anode elements are provided with means for establishing an external circuit thereto whereby the cathode is normally negatively biased electrically with respect to the anode elements. Variations in the normal biasing current are a function of the pressure signal applied to the diaphragms and the geometry of the orifice as will appear more clearly hereinafter as the description proceeds. The invention also contemplates an arrangement in which a plurality of orifices in the baffle member and cathode may be employed for bringing the hydraulic impedance of the detector into matching relation with a predetermined frequency of signal to be received by the detector. It is further contemplated that, if desired, several baffle sections having cathode elements respectively disposed therein may be arranged in series in accordance with the teaching of the present invention.

An object of the invention is the provision of a new and improved means for more quickly detecting vibrations or pulsations transmitted through an elastic medium for a distant source.

Another object is the provision of new and improved means for increasing the sensitivity of an electrolytic detector to weak acoustic signals and decreasing the signal response time thereto.

Another object of the invention is the provision of a new and improved detector having low power consumption and high pressure sensitivity.

Another object of the invention resides in the provision of new and improved means for adjusting the impedance of an electrolytic detector to a predetermined frequency of signal to be received thereby.

Still another object is the provision of an electrolytic detector wherein the negative ions are more rapidly brought into contact with the negatively biased cathode in response to a pressure differential acoustic signal received by the detector.

Other objects and many of the attendant advantages of this invention will be readily appreciated as the same becomes better understood by reference to the following detailed description when considered in connection with the accompanying drawings wherein:

FIG. 1 is a plan view of the device of the present invention partially broken away;

FIG. 2 is a sectional view taken on the line 2—2 of FIG. 1;

FIG. 3 is an enlarged view in section and partially broken away of the baffle element of FIG. 2 and the cathode disposed therein;

Figure 4:
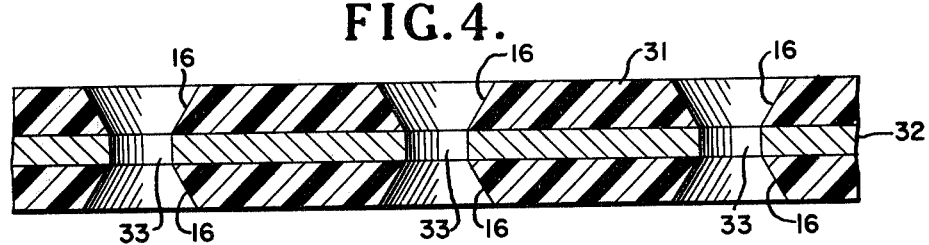
FIG. 4 is a fragmentary sectional view of a baffle element suitable for use with the device of FIG. 2 and having a plurality of apertures therein.

Referring now to the drawings on which like numerals of reference are employed to designate like parts throughout the several views, and more particularly to FIGS. 1, 2 and 3 thereof is shown thereon a detecting device generally indicated by the numeral 10, according to a preferred embodiment of the present invention. The device comprises a housing 11 composed preferably of any thermoplastic insulating material suitable for the purpose and which is chemically inert to an electrolyte. The housing 11 is provided with an inwardly extending annular portion 12 having an annular rib 13 formed thereon to which is secured as by heat-sealing at 14, a disc 15 composed preferably of the same material as the housing 11 thereby forming a baffle member within the housing.

As shown on FIGS. 2 and 3, the disc 15 is reduced in thickness at the central portion thereof and an electrical conducting cathode 17 composed preferably of platinum plate is molded therein. Thus by this arrangement a relatively thin insulating protective coating 18 is provided on each side of the aforesaid plate. The plate 17 is provided with a centrally disposed minute orifice 19 in registration with an opening 21 formed on each of the coatings 18 and of the same diameter as the orifice 19. The coating portion 18 of the disc 15 is provided with a pair of conic surfaces 16 disposed on opposite sides of the cathodes as illustrated whereby a high degree of sensitivity and rapidity of response to the acoustic signals is achieved. A conductor 20 is molded in the casing 11 having one end secured to the cathode 17, the other end thereof extending beyond the housing 11 thereby to establish an external electrical connection to the cathode. The cathode is embedded in the disc in the aforesaid manner and completely encased in insulating material except for the exposed metallic surface 22 bordering on the orifice 19.

The housing 11 is also provided with a pair of oppositely disposed annular recesses 23 formed in the outer surface. Disposed within each recess and heat-sealed to the housing as at 24 is a flexible corrugated diaphragm 25, the diaphragm being composed of any material suitable for the purpose but preferably of a thermoplastic which is chemically inert to the electrolyte.

It will be noted by the aforesaid housing arrangement including the annular portion 12, rib 13, disc 15 and the diaphragms 25, that the detector is provided with two chambers or cells 26 interconnected through orifice 19 and openings 21 formed in a baffle member therebetween. The chambers are filled with a suitable electrolyte 27 consisting of a solution of iodine and potassium iodide in a water or methanol solvent, the filling being accomplished under vacuum to remove all air. A typical concentration of electrolyte is 0.05 $NI_2$ and 0.4 NKI, although, if desired other suitable concentrations may be employed. For example, lithium iodide may be substituted for the potassium iodide, if desired. Moreover, it will be understood, that the current vs. pressure characteristics of the detector depend upon the particular concentration employed, the characteristics of the solvent, and the configuration of the conducting and baffle components of the detector.

A pair of mutually spaced wires or noble conducting electrodes 28 preferably composed of platinum are molded in the housing 11, one end of each electrode extending into one of the chambers and immersed in the aforesaid electrolyte, the other end of each electrode extending beyond the housing 11 thereby to establish an external electrical connection thereto, the electrodes 28 preferably being electrically connected externally of the housing as at 29 and referred to hereinafter as an anode.

The aforesaid detector has the characteristic that the current output for no applied pressure variation (background current), as a function of the voltage between the anodes 28 and the cathode 22, rises sharply with increase in voltage until a certain voltage is reached, and thereafter increases only slightly until another specific voltage is reached, at which time the current again increases sharply. Moreover, the values of these voltages depend upon the proporations of the elements forming the electrolyte, the electrode material and the geometry of the orifice in the baffle member. The detector may be biased at any suitable voltage for which the chemical reactions at the anode and cathode are exact opposites. Furthermore when a pressure differential is applied to the detector, the electrolyte 27 is forced through the orifice 19 and openings 21 in response to movement of the diaphragms. When this occurs an increased number of ions contact the cathode 22 and thus increase the output current. However, the functional form of the current-pressure relation is dependent upon several factors. A specific example is that of employing platinum electrodes and a solution of iodine and potassium iodide in a methanol base. The upper limit on bias which has been found to be satisfactory in this case is about 0.9 volt.

The chemical reactions which take place when the detector is actuated are set forth in the following examples:

(a) $I_2 + I^- \rightleftharpoons I_3^-$ (b) $I_3^- + 2e \rightarrow 3I^-$ at the cathode (c) $3I^- \rightarrow I_3^- + 2e$ at the anode Thus since reactions (b) and (c) are exact opposites, there is no destruction of the unit during the chemical reactions or processes.

Furthermore, the biasing circuit current is controlled by the number of $I_3^-$ ions which come in contact with the cathode. Moreover, when there is no electrolyte flowing through the cathode orifice, the current is controlled by diffusion; the flow of electrolyte increases the number of available $I_3^-$ ions at the cathode, hence the increased current in the biasing circuit. The flow of electrolyte is greatly facilitated by the conic surfaces 16 abutting the cylindrical surface 22 in the cathode. In use, the detector is biased in a manner such that the zero signal current will remain substantially constant despite relatively large variations in the bias voltage. Furthermore, since at zero signal, the background current is diffusion controlled, it is a function of the exposed area of the cathode, the iodine concentration of the electrolyte and the potential gradient in or near the cathode orifice. However, the signal-to-background output of the detector is not affected by changes in iodine concentration, the signal current being changed in the same ratio as the background.

The power requirement of the electrolytic detector herein disclosed is extremely low; the detector used as the sensitive element in an acoustic filter for use in acoustic mines (cathode orifice diameter=0.015″, length=0.001″; electrolyte: 0.05 N $I_2$, 0.4 N KI) requires 3-4 microwatts of power for operation inder no-signal conditions, and has a power output of 60 microwatts with a pressure signal of 100 dynes/$cm^2$ at 30 cps. The normal frequency range of the device is 0.001-100 cycles per second.

On FIG. 4 is shown a baffle plate 31 having at least three apertures therein defined by the conic surfaces 16 within which is disposed a cathode member 32 having a plurality of apertures 33 in registration with the apertures in the baffle plate. By arranging the apertures in parallel relationship in the manner disclosed in FIG. 4, an arrangement is provided in which the hydraulic impedance of the detector is reduced and thus may be brought into matching relation a predetermined frequency range or band of the acoustic signal to be received thereby and with other components of the hydraulic circuit. Whereas three apertures are shown on FIG. 4, it will be understood that this is by way of example only and that, if desired, a greater or lesser number of apertures may be employed.

Figure 5:
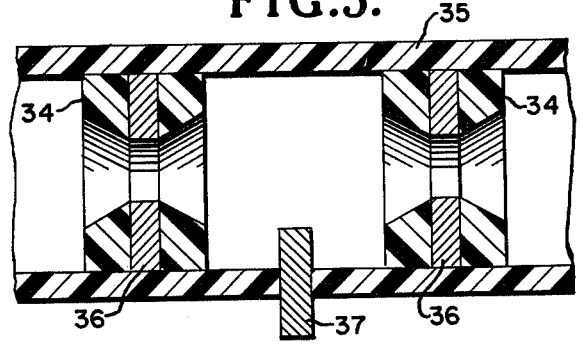
FIG. 5 is a view in section and partially broken away of a series arrangement of apertures employing two cathodes and one anode according to an alternative form of the invention.

In FIG. 5 is shown an alternative form of baffle member comprising two baffle sections 34 connected in sealed relation to a hollow fluid conducting supporting member 35 interconnecting chambers 26 and in mutually spaced relation such that the apertures formed therein are in series. Each of the baffle sections 34 is provided with a pair of conic surfaces formed generally in the manner of the conic surfaces of FIG. 4 and having a cathode 36 arranged therebetween. An anode 37 is disposed between the pair of cathodes 36 generally in the manner shown.

Figure 6:
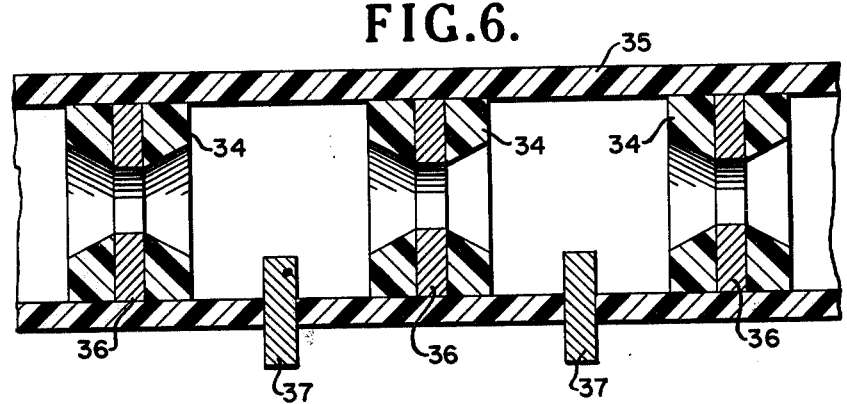
FIG. 6 is a view similar to FIG. 5 showing three baffle sections in series.

In FIG. 6 is shown three baffle sections 34 connected to the member 35 generally in the manner of FIG. 5 thereby providing a series arrangement of orifices to increase the hydraulic impedance of the detector further than the increase in hydraulic resistance obtained with the arrangement of FIG. 5. A pair of anodes 37 are employed to establish electrical communication with the electrolyte, each of these anodes being disposed between a pair of cathodes substantially as shown. It will, of course, be understood that the anodes are electrically connected together and to a source of positive biasing voltage and that the cathodes 36 are likewise connected together and to a source of negative biasing voltage in generally the same manner as the cathodes of FIG. 5.

Figure 7:
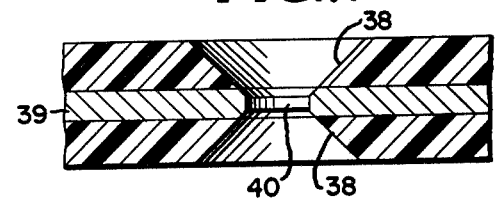
FIG. 7 is a view partially broken away and in section showing a cathode having an aperture therein in accordance with another alternative form of the invention.

In FIG. 7 is shown an alternative geometric arrangement of the cathode and conic surfaces abutting the aperture therein. In this arrangement the conic surfaces 38 extend partly through the cathode 39 in such manner as to form a cylindrical aperture 40 within the cathode of less diameter than the smaller diameter of the frustum formed in the baffle member and of axial length less than the thickness of the cathode plate. With this arrangement a still further increase in sensitivity of response to a weak acoustic signal is obtained by reason of the increased mechanical contact of the negative ions abutting the fluid contact surface of the cathode in response to a flow of electrolyte in either direction through the aperture.

Figure 8:
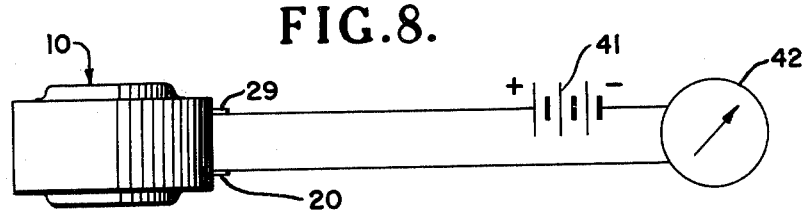
FIG. 8 is a circuit diagram suitable for use with the device of the present invention.

On FIG. 8 is shown in schematic form a circuit suitable for use with the detector herein disclosed in which the anode and cathode elements are connected to the positive and negative terminals respectively of a voltage source 41, an electroresponsive device 42, such for example as the meter illustrated, being included in the circuit.

The device of the present invention is well suited as a detector for acoustic signals and particularly for acoustic signals of weak strength. Because of its high degree of sensitivity to such signals, speed of response thereto and low power consumption it is well suited for use with a marine mine. However it is not so limited as it may be advantageously employed with other detection controlled devices or as a band pass filter, the frequency of the signal band passed by the device being controlled by the number and arrangement of the orifices in the baffle member, the geometry of the orifices, and the specific shape of the orifice within the cathode element. The invention herein disclosed resides in the arrangement and configuration of parts which are new and particularly in the conic surfaces abutting the aperture in the cathode.

I have found that logarithmic response may be achieved by employing a straight orifice, provided the diameter of the orifice exceeds the axial length thereof. When employing orifices having sloping surfaces as disclosed herein to improve sensitivity and response time to a weak acoustic signal, logarithmic response may be obtained by the proper configuration of the orifice.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A pressure responsive electrolytic detector of the character disclosed comprising a hermetically sealed casing having an electrolyte composed of a solution of iodine and potassium iodide in a solvent disposed therein, a baffle member within said casing arranged to form two fluid filled chambers on opposite sides thereof, said casing and baffle member being composed of insulating material, a pair of electrically connected inert electro-conductive anodes, each of said anodes being disposed within one of said chambers, an electro-conductive cathode having an aperture therein and arranged transversely within said baffle member, a pair of conic surfaces on said baffle member on opposite sides of said cathode and forming an aperture in contiguous abutting relation with the aperture in said cathode, said conic surfaces increasing the rate of flow of the electrolyte from one to the other of said chambers, and means on said casing responsive to acoustic signals for providing a signal detection characterized by a unidirectional electrical current flow in correlation to flow of electrolyte alternatingly between said chambers as an acoustic signal is received thereby.

2. A claim according to claim 1 and including an external circuit connected to said anodes and cathode and having means therein for continuously applying a positive electrical bias to the anodes, and electroresponsive means in said circuit for indicating variations in the biasing current caused by said flow of the electrolyte.

3. A claim according to claim 1 in which the cathode is molded within said baffle member.

4. A claim according to claim 1 in which the last named means comprises a pair of flexible diaphragms composed of chemically inert non-conductive material.

5. A pressure responsive electrolytic detector of the character disclosed comprising a hermetically sealed casing composed of chemically inert insulating material and having an electrolyte composed of a solution of iodine and potassium iodide in a solvent disposed therein, baffle means within said casing, means forming a chamber on each side of said baffle means, an electro-conductive anode in each of said chambers, an electro-conductive cathode molded within said baffle means and having an aperture arranged therein, means including a pair of conical surfaces on opposite sides respectively of said baffle means in axial alignment with said aperture for causing an increase in the rate of flow of the electrolyte through said aperture as a small portion of the electrolyte is shifted from one to the other of said chambers, and means responsive to acoustic signals for shifting said small portion of the electrolyte.

6. A claim according to claim 5 in which said aperture in the cathode comprises a cylindrical portion of less axial length than the thickness of the cathode and a pair of conical surfaces of the same conical configuration as the conical surfaces on said baffle and continues therewith.

7. A pressure responsive electrolytic detector of the character disclosed comprising a hermetically sealed casing having an electrolyte composed of a solution of iodine and potassium iodide in a solvent disposed therein, a baffle member having a plurality of conical recesses forming apertures therein and arranged within said casing to form two fluid filled chambers on opposite sides thereof, said casing and baffle member being composed of chemically inert insulating material, a pair of electrically connected electro-conductive anodes, each of said anodes being disposed within one of said chambers, a cathode having a plurality of openings therein arranged transversely within said baffle member and in axial alignment and contiguous abutting relation with said apertures respectively, said conic recesses increasing the rate of flow of the electrolyte from one to the other of said chambers thereby to decrease the hydraulic impedance in proportion to the number of said openings, means on said casing responsive to acoustic signals for causing a flow of a small portion of the fluid to flow alternatively from one to the other of said chambers as an acoustic signal is received thereby.

8. A pressure responsive electrolytic detector of the character disclosed comprising a hermetically sealed casing having an electrolyte composed of a solution of iodine and potassium iodide in a solvent disposed therein, a plurality of baffle members disposed within said casing in spaced relation with respect to each other and composed of insulating material, electro-conductive anode means disposed between said baffle members, a plurality of electro-conductive cathodes molded in said baffle members respectively, each of said cathodes having an aperture therein, a pair of conic recesses in each of said baffle members on opposite sides of said cathodes in alignment with said apertures respectively and forming a plurality of openings in registration therewith and in series arrangement whereby the hydraulic impedance is increased in proportion to the number of said openings.

9. A pressure responsive electrolytic detector of the character disclosed comprising a hermetically sealed casing having an oxidation-reduction electrolyte solution disposed therein, a plurality of baffle members disposed within said casing in mutually spaced relation and composed of insulating chemically inert material, an electro-conductive anode means of electron interchange inert material disposed between each of said baffle members, a plurality of electro-conductive cathodes molded in said baffle members respectively, each of said cathodes having an aperture disposed therein, a pair of conic recesses disposed in each of said baffle members on opposite sides of said cathodes in alignment with said apertures respectively and forming a plurality of openings in registration therewith and in series arrangement whereby the hydraulic impedance of the detector is increased in proportion to the number of said openings.

10. A pressure responsive electrolytic detector of the character disclosed comprising a hermetically sealed casing having an electrolyte of an oxidizing-reduction character in solution disposed therein, a baffle member within said casing arranged to provide two electrolyte filled chambers on opposite sides thereof, said casing and baffle members being composed of electrically insulating chemically inert material, a pair of electrically connected electron interchange inert anodes of electro-conductive material, each of said anodes being disposed within one of said chambers, and an electron interchange inert electro-conductive cathode disposed within said baffle member and having a transversely disposed aperture therein for fluid communication between said chambers, a pair of conically concave surfaces on said baffle member on opposite sides of said cathode and forming an aperture in continuous abutting relation with the aperture in said cathode, and means on said casing disposed to be responsive to acoustic signals for providing a signal detection characterized by a unidirectional electrical current flow in the anode-cathode circuit of said detector and correlative to ion concentration changes in said solution at said cathode with flow of electrolyte alternatingly between said chambers under influence of an applied acoustic signal.

* * * * *